Figure 6:
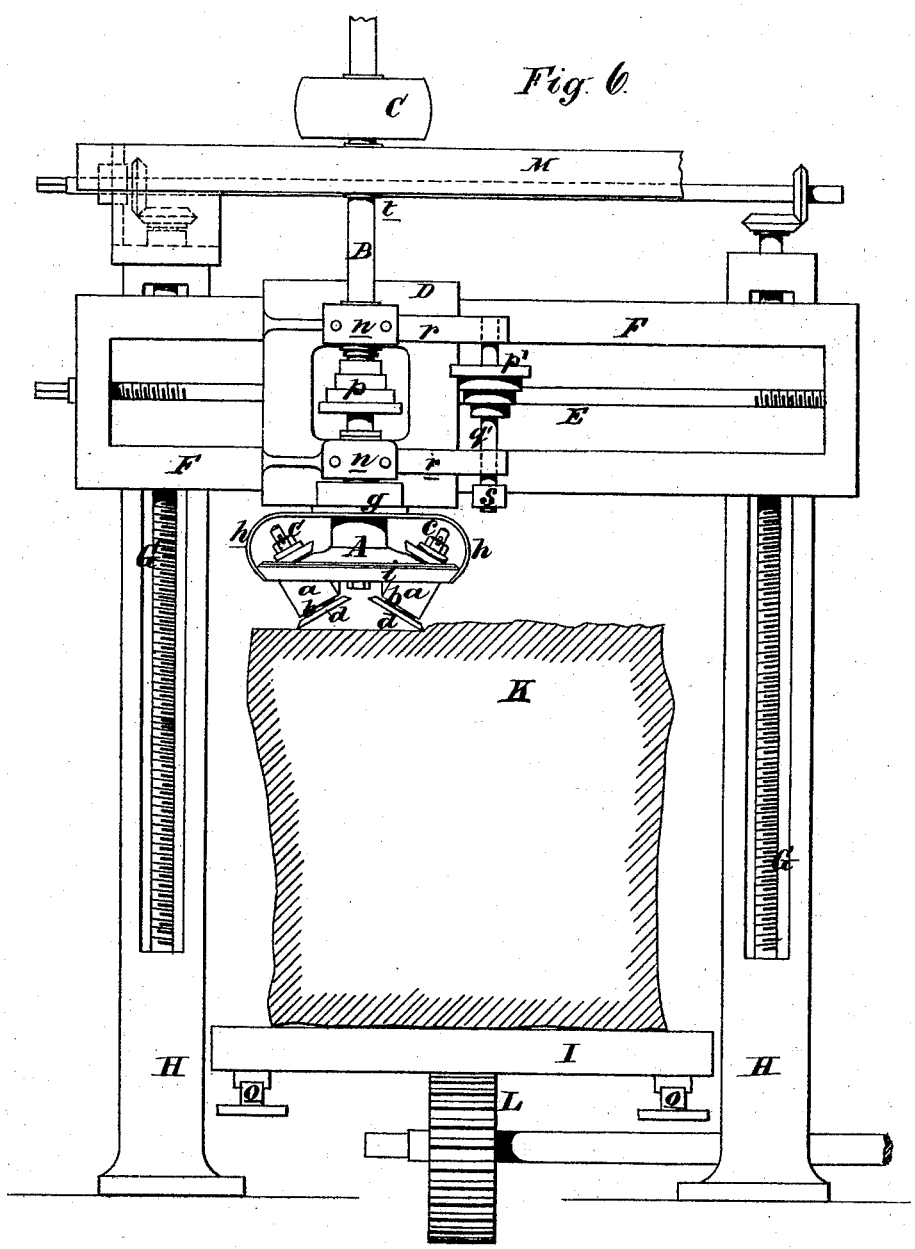

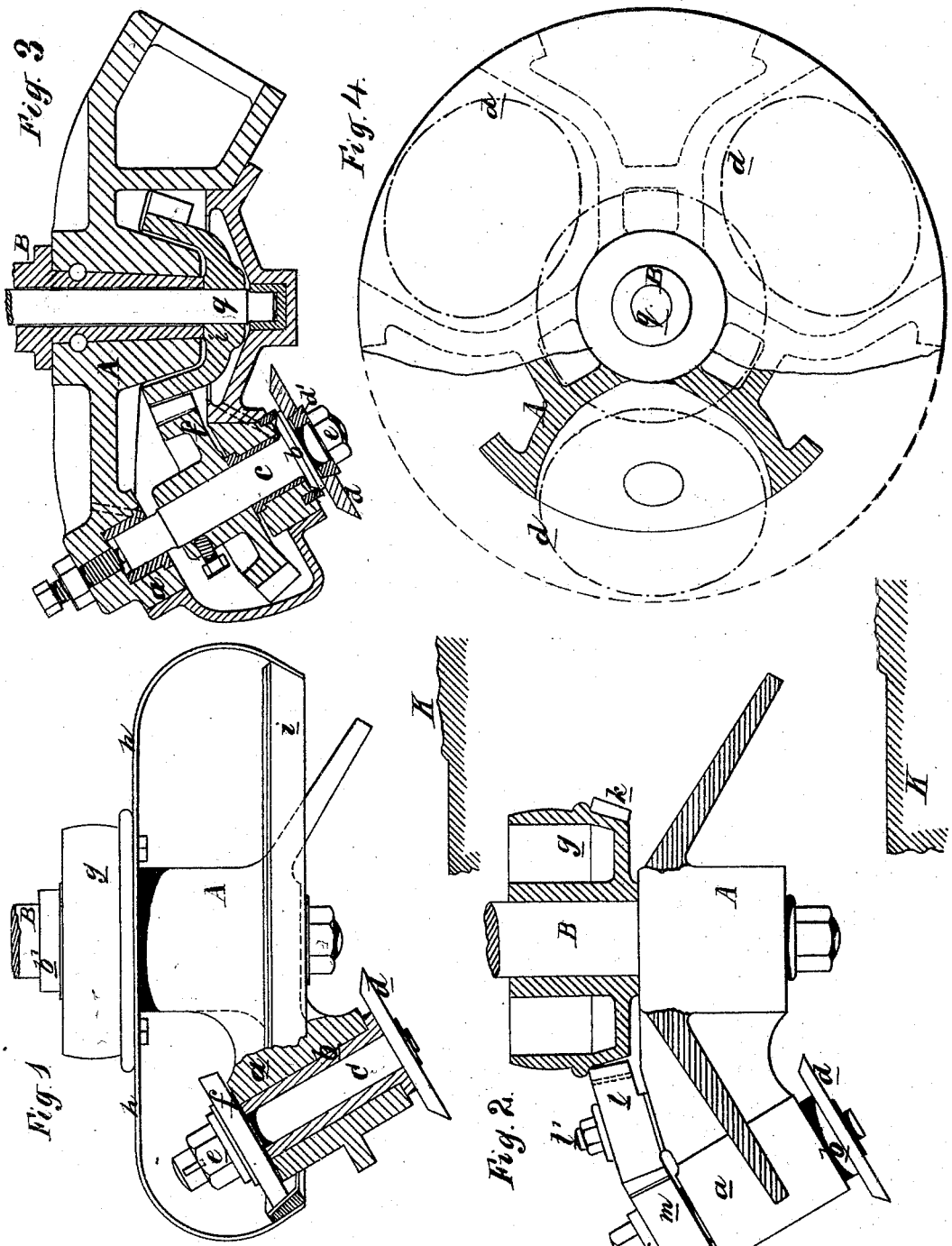

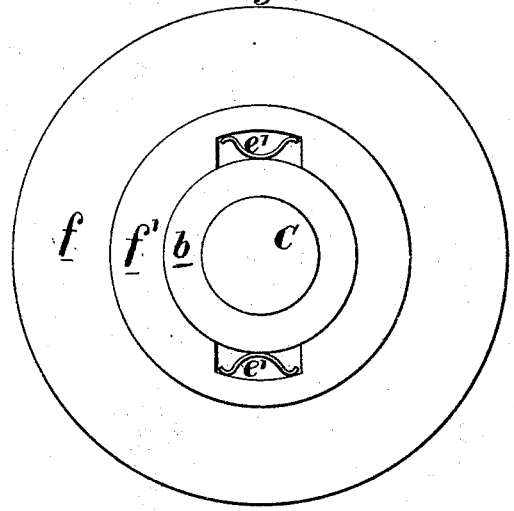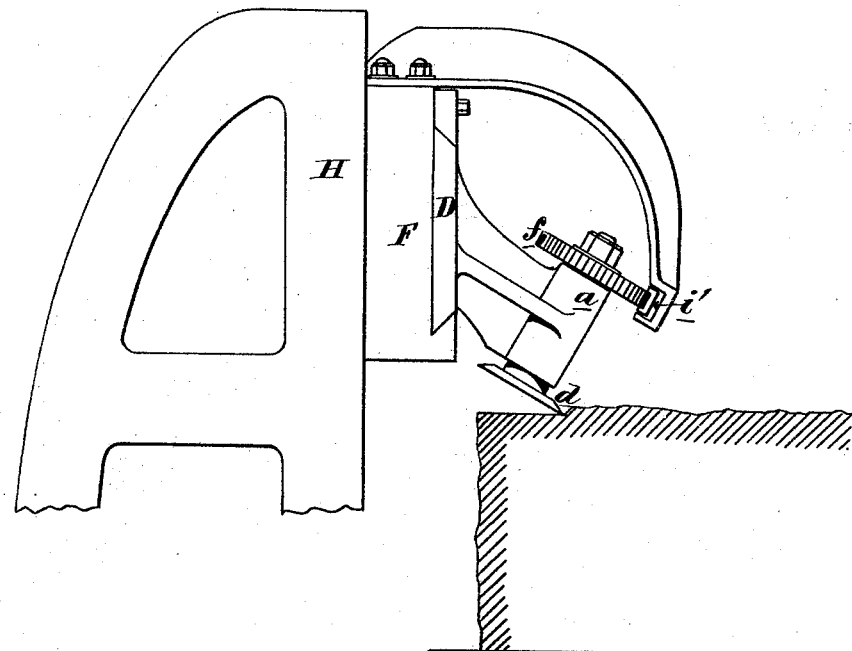

J. D. BRUNTON.
DRESSING STONE.

No. 184,330. Patented Nov. 14, 1876.

Witnesses
Henry Howson Jr
Harry Smith

John Dickinson Brunton
by his Attorneys
Howson and Son

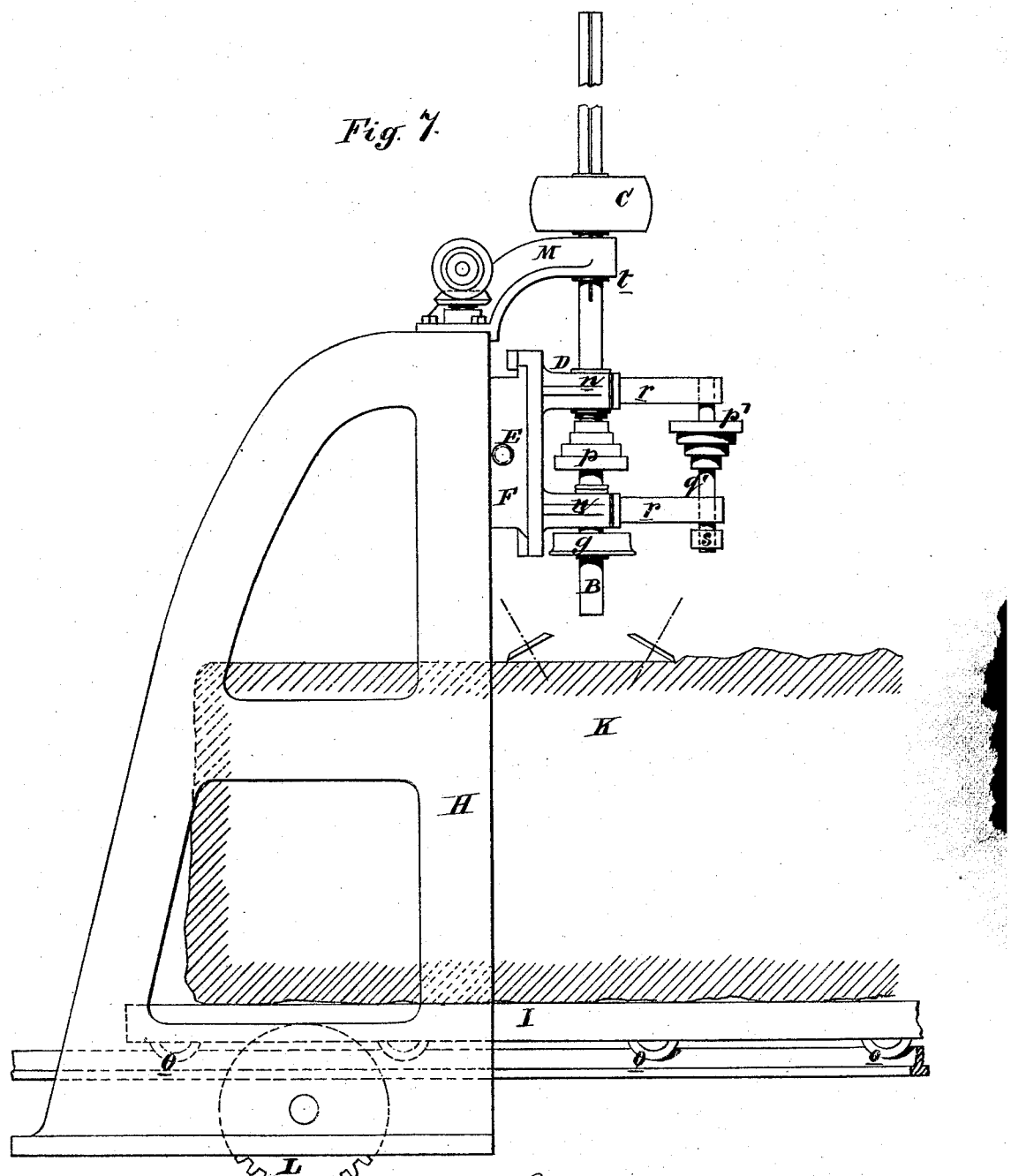

UNITED STATES PATENT OFFICE.

JOHN D. BRUNTON, OF KENTISH TOWN, ENGLAND.

IMPROVEMENT IN DRESSING STONE.

Specification forming part of Letters Patent No. 184,330, dated November 14, 1876; application filed August 21, 1876.

*To all whom it may concern:*

Be it known that I, JOHN DICKINSON BRUNTON, of 6 Leighton Crescent, Kentish Town, in the county of Middlesex, England, have invented improvements in the method of applying circular cutters to the cutting, dressing, planing, and shaping of stone, of which the following is a specification:

My invention relates to an improvement in the Letters Patent granted to me December 26, 1871, for a stone-dressing machine in which the stone was dressed by means of one or more cutting-disks mounted loosely on their axes; and the object of my invention is to so construct a machine having cutting-disks that the action of these disks on the stone will be more rapid and effective. This object I attain by means of a series of inclined cutting-disks, having a positive rotary motion imparted to them other than that which would be imparted by contact with the stone, as more fully explained hereafter.

In the accompanying drawing, Figures 1, 2, and 3 are side views, partly in section, of revolving cutting-disks arranged in different forms of chucks; Fig. 4, a plan view of Fig. 3; Fig. 5, an enlarged plan of view of a portion of the cutter spindle and socket; and Figs. 6, 7, and 8, views showing my invention applied to machines of different construction.

In the machine described in my above-mentioned patent the cutting-disks were free to turn on their axes, and it was found that on this account their action on the stone was not so effective as might be desired, more especially in dressing plane surfaces, and to overcome this objection I impart to the inclined cutting-disks a positive rotary motion other than that which would be imparted to them by contact with the stone if the cutters were free to turn on their axes. This rotary motion may be imparted to the cutters by devices of different construction, as described hereafter.

In the construction shown in Fig. 1, A is the chuck, keyed or otherwise fixed upon the end of the spindle B, and carried around with it as it revolves, and forming part of the chuck A is an inclined bearing, *a*. I prefer to employ three of these bearings *a*, but there should be at least two on each chuck. To each bearing is adapted a socket, *b*, through the center of which passes the cutter-bolt *c*. The conical head of this cutter-bolt fits into a conical hole in the center of the cutting-disk *d*, which, by means of the nut *e*, is held firmly against the socket *b*, the cutter, cutter-bolt, and socket all rotating together as one piece in the bearing *a*. To the upper end of the socket *b*, which projects above the bearing, is attached a roller or toothed wheel, *f*, which may be either keyed upon the socket *b*, or held in frictional contact therewith by springs *e' e'* in slots in the hub *f'* of the wheel *f*, as shown in the enlarged plan view, Fig. 5, so that the wheel will yield under excessive pressure. Upon the spindle B, between the collar *b'* and the chuck A, is mounted loosely a belt-pulley or toothed wheel, *g*, to which there are attached bent arms *h h*, and to the outer ends of these arms is attached a ring, *i*, lined on its inner face with india-rubber, leather, or any suitable substance, so as to cause the ring to have a better hold upon the edge or circumference of the rollers *f*, with which it is contact; or a toothed rack may be formed on the interior of the ring, the rollers *f*, in this case, being also toothed and gearing into it.

It will be evident if the pulley *g* and ring *i* are caused to revolve in one direction while the chuck revolves in the opposite direction, the cutters will be caused to revolve rapidly round their own centers, as well as round the axis of the spindle B.

If it is not desired to impart such a rapid rotary motion to the cutters, the wheel *g* and ring *i* may be held stationary, or even caused to revolve slowly in the same direction as the spindle B, according as circumstances may require.

Since these cutters, owing to their inclined position, present a sharp cutting-edge to the stone, and have a positive rotary motion imparted to them, the said cutters rapidly chip away and dress the surface of the stone with which they are brought in contact, as shown in Fig. 6.

In the modification, Fig. 2, there is cast upon or attached to the wheel or pulley *g* a toothed wheel, K, gearing into an intermediate pinion, *l*, which is mounted on a pin, *l'*, in the chuck A, and gears into a toothed wheel, *m*, keyed on the socket *b*. By this means also there is imparted to the cutters a positive rotary motion, the rate of which can be determined by regulating the revolutions of the central wheel $k$, as above described.

In the modification shown in Figs. 3 and 4 the socket $b$ is dispensed with, and each cutter $d$ is fixed against a collar, $b$, on the cutter-bolt $c$, by means of the nut $e$ and the conical ring $d'$. In this arrangement the positive motion is imparted to the cutters by means of the central wheel $i$, which gears into the wheels $f$ on the cutter-spindles. This wheel $i$ is keyed on the shaft $q$ passing through the center of the spindle B, and is driven by a belt or any convenient means.

Figs. 6 and 7 illustrate my invention as applied to a machine for producing plane surfaces on stone. The spindle B of the chuck is driven by means of a pulley, C, and its lower end is supported in bearings $n\ n$ carried on a slide, D, which latter is capable of being moved from side to side of the machine by means of the screw E in the cross-slide F. Vertical movement is imparted to this slide F by screws G G as in an ordinary metal-planing machine. H H are the standards of the machine, and I is the bed, on which rests the stone K to be dressed. The bed I rests upon slides or rollers $o\ o$, and is moved by a rack and pinion, L, Figs. 6 and 7, or by any other of the well-known methods of imparting motion to planing-machine tables. Between the bearings $n\ n$ on the spindle B are arranged a series of pulleys, $p$, from which another series of pulleys, $p'$, may derive motion through the medium of a belt. The pulleys $p'$ are mounted on a shaft, $q'$, supported in brackets $r\ r$ extending from the slide D, which shaft also carries a pulley, $s$, for transmitting motion by means of a belt to the pulley $g$, which causes the rotation of the cutting-disks, as before described. The wheel $g$, however, may be driven or controlled by any other convenient means—for instance, a toothed wheel may be substituted for the pulley $g$, such wheel gearing into a toothed wheel on the shaft $q'$. The spindle B, in addition to being carried in the bearings $n\ n$, is further supported by means of a guide-bar, M, carrying a bearing, $t$, through which the spindle B is free to slide as the slide F is raised or lowered, such bearing $t$ being also free to move laterally in the guide-bar M, as the slide D is moved from one side of the machine to the other.

When the machine is in operation the slide D is fixed in such a position as that, when the stone to be dressed comes in contact with the revolving cutters, these cutters shall chip away from and dress the surface of the stone, the depth of cut varying according to circumstances and the nature of the stone. The spindle B is set in rotation, (the pulley $g$ being held stationary or not, as desired,) and the table I, as it moves, brings the stone in contact with the revolving cutters, which chip away from and dress the surface of the stone operated on.

In the machine shown in Fig. 8 rotary motion is imparted to each cutter by a slightly different arrangement of devices. H is one of the standards of the machine, and F the cross-slide, in which the sliding bar D is caused to reciprocate. To the bar D is attached one or more bearings, $a$, into each of which is fitted a cutter, $d$, in one of the ways already described. Each cutter-spindle carries the usual toothed wheel or roller, which gears into or is in contact with the toothed rack or friction-bar $i'$, an end view of which is seen in Fig. 8. A horizontal reciprocating motion is imparted to this rack or bar so as to cause the rotation of the cutters in the bearings $a$ through the medium of the wheel $f$.

I claim as my invention—

A stone-dressing machine, in which one or more cutting-disks, inclined in respect to the surface of the stone to be dressed, have imparted to them a positive rotary motion other than that which would be imparted by contact with the stone, all as set forth.

In witness whereof I have signed my name to this specification in the presence of two subscribing witnesses.

JOHN DICKINSON BRUNTON.

Witnesses:
  CHAS. MILLS,
    47 *Lincoln's Inn Fields, London.*
  FREDK. C. DYER,
    *Same place.*